United States Patent
Li (10) Patent No.: US 11,122,222 B2
(45) Date of Patent: Sep. 14, 2021

(54) WEARABLE APPARATUS, ANTI-PEEPING DISPLAY SYSTEM AND ANTI-PEEPING DISPLAY METHOD

(71) Applicant: BOE TECHNOLOGY GROUP CO., LTD., Beijing (CN)

(72) Inventor: Wenbo Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 172 days.

(21) Appl. No.: 16/470,431

(22) PCT Filed: Mar. 29, 2018

(86) PCT No.: PCT/CN2018/081132
§ 371 (c)(1),
(2) Date: Jun. 17, 2019

(87) PCT Pub. No.: WO2018/233340
PCT Pub. Date: Dec. 27, 2018

(65) Prior Publication Data
US 2019/0342509 A1   Nov. 7, 2019

(30) Foreign Application Priority Data
Jun. 19, 2017 (CN) .................. 201710463947.X (51) Int. Cl.
*H04N 5/33* (2006.01)
*H04N 13/332* (2018.01)
(Continued)

(52) U.S. Cl.
CPC ............ *H04N 5/33* (2013.01); *G06F 21/602* (2013.01); *H04N 13/332* (2018.05);
(Continued)

(58) Field of Classification Search
CPC .. H04N 2213/008; H04N 5/33; G06F 21/602; G09G 3/3208; G09G 3/36; G09G 2358/00
(Continued)

(56) References Cited

U.S. PATENT DOCUMENTS

2008/0277585 A1* 11/2008 Hasegawa ................ G06T 7/30
250/334
2011/0173703 A1   7/2011 Kim et al.
(Continued)

FOREIGN PATENT DOCUMENTS

CN    102625131 A    8/2012
CN    103152575 A    6/2013
(Continued)

OTHER PUBLICATIONS

Kijima et al., "Distributed Display Approach Using PHMD with Infrared Camera", Proceedings of the IEEE Virtual Reality 2002 (VR'02) 1087-8270/02 © 2002 IEEE, pp. 1-8 (Year: 2002).*
(Continued)

*Primary Examiner* — Khalil Naghdali
(74) *Attorney, Agent, or Firm* — Brooks Kushman P.C.

(57) ABSTRACT

A wearable apparatus, an anti-peeping display system and an anti-peeping display method are disclosed. The anti-peeping display system includes a display apparatus and a wearable apparatus, the display apparatus is configured to display infrared images, the wearable apparatus acquires the infrared images and converts the infrared images to original images, and the original images are visible images.

11 Claims, 6 Drawing Sheets

(51) Int. Cl.
*G06F 21/60* (2013.01)
*G09G 3/3208* (2016.01)
*G09G 3/36* (2006.01)

(52) U.S. Cl.
CPC ............. *G09G 3/3208* (2013.01); *G09G 3/36* (2013.01); *G09G 2358/00* (2013.01); *H04N 2213/008* (2013.01)

(58) Field of Classification Search
USPC ........................................................ 380/243
See application file for complete search history.

(56) References Cited

U.S. PATENT DOCUMENTS

| | | |
|---|---|---|
| 2014/0002898 A1 | 1/2014 | Kim |
| 2014/0055322 A1 | 2/2014 | Cai et al. |
| 2014/0299660 A1 | 10/2014 | Melzer |
| 2016/0050345 A1* | 2/2016 | Longbotham ...... G02B 27/0172 348/47 |
| 2017/0054559 A1 | 2/2017 | Melzer |

FOREIGN PATENT DOCUMENTS

| | | |
|---|---|---|
| CN | 103631018 A | 3/2014 |
| CN | 104504350 A | 4/2015 |
| CN | 205003374 U | 1/2016 |
| CN | 106019712 A | 10/2016 |
| CN | 106405845 A | 2/2017 |
| CN | 106570816 A | 4/2017 |
| CN | 206074918 U | 4/2017 |

OTHER PUBLICATIONS

Choi et al., "Cloud based Video Storage System with Privacy Protection", IEEE Jul. 1-3, 2015 ICACT2015, pp. 460-463 (Year: 2015).*
Matoba et al., "Optical Techniques for Information Security", Proceedings of the IEEE | vol. 97, No. 6, Jun. 2009, pp. 1129-1148 (Year: 2009).*
Second Office Action for Chinese Application No. 201710463947. X, dated May 15, 2020, 10 Pages.
International Search Report and Written Opinion for Application No. PCT/CN2018/081132, dated Jun. 8, 2018, 9 Pages.
Extended European Search Report for Application No. EP 18820942. 3, dated Dec. 14, 2020, 8 Pages.

* cited by examiner

| 0 | 1 | 1 | 1 | 1 | 0 | 0 | 1 |
|---|---|---|---|---|---|---|---|
| 1 | 0 | 0 | 0 | 0 | 1 | 0 | 0 |
| 0 | 0 | 1 | 0 | 1 | 1 | 0 | 1 |
| 0 | 1 | 1 | 0 | 1 | 0 | 1 | 1 |
| 1 | 0 | 0 | 1 | 1 | 0 | 1 | 0 |
| 0 | 1 | 1 | 0 | 1 | 1 | 0 | 1 |
| 1 | 0 | 1 | 0 | 1 | 0 | 1 | 0 |
| 0 | 0 | 1 | 1 | 1 | 1 | 0 | 0 |

Fig. 4B

| 1 | 1 | 1 | 1 | 1 | 1 | 1 | 1 |
|---|---|---|---|---|---|---|---|
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

WEARABLE APPARATUS, ANTI-PEEPING DISPLAY SYSTEM AND ANTI-PEEPING DISPLAY METHOD

CROSS-REFERENCE TO RELATED APPLICATION

This application is the U.S. national phase of PCT Application No. PCT/CN2018/081132 filed on Mar. 29, 2018, which claims priority to Chinese Patent Application No. 201710463947.X filed on Jun. 19, 2017, which are incorporated herein by, reference in their entireties.

TECHNICAL FIELD

The present disclosure relates to the field of display technology, and in particular, relates to a wearable apparatus, an anti-peeping display system and an anti-peeping display method.

BACKGROUND

Wide view-angle screens are often used in display apparatuses such as mobile phones, PADs, TVs, and the like. However, these display apparatuses are rarely provided with an anti-peeping technology, and privacy requirements of users may not be satisfied, thus resulting in frequent occurrence of information leakage incidents in recent years. With confidentiality protection awareness of enterprises and individuals being enhanced, a great market demand for anti-peeping technology of display apparatuses has emerged.

SUMMARY

A wearable apparatus, an anti-peeping display system and an anti-peeping display method are provided in the present disclosure.

In a first aspect, a wearable apparatus is provided in the present disclosure and includes at least one infrared camera for acquiring infrared images; a controller for generating at least one original image according to the infrared images; and at least one display screen for displaying the at least one original image; wherein the at least one original image is at least one visible image, and the at least one original image includes a same image for realizing a two-dimensional display, or the at least one original image includes two images having different viewing angles and for realizing a three-dimensional display.

Optionally, the wearable apparatus further includes at least one imaging element, at a display side of the at least one display screen and for imaging the at least one original image so as to generate at least one display image, wherein the at least one imaging element is further to control a distance between the at least one display image and the at least one display screen, so that the at least one display image is located at a display region of a display apparatus providing the infrared images, wherein the at least one display image is at least one upright and enlarged virtual image of the at least one original image.

Optionally, the at least one imaging element includes a liquid crystal lens structure with an adjustable focal length.

Optionally, the infrared images are encrypted infrared images, the controller further includes a decryptor, the decryptor is for decrypting the encrypted infrared images or controlling the at least one infrared camera to decrypt the encrypted infrared images.

In a second aspect, an anti-peeping display system is provided in the present disclosure and includes a display apparatus for displaying infrared images; and the wearable apparatus according to the first aspect.

In the anti-peeping display system, the display apparatus includes an encryptor for encrypting the infrared images so as to generate encrypted infrared images; and the controller further includes a decryptor for decrypting the encrypted infrared images or controlling the at least one infrared camera to decrypt the encrypted infrared images.

In the anti-peeping display system, the infrared images include N initial image frames, N is a positive integer larger than or equal to 1. The encryptor is for generating an inverse image of each of the N initial image frames, the encrypted infrared images include 2N image frames, a (2K−1)-th image frame of the encrypted infrared images is a K-th initial image frame of the infrared images, and a 2K-th image frame of the encrypted infrared images is an inverse image of the (2K−1)-th image frame of the encrypted infrared images, wherein K is a positive integer larger than or equal to 1, and 1≤K≤N. The decryptor is for controlling a sampling frequency of the at least one infrared camera to be same as a display frequency of the initial image frames, and controlling the at least one infrared camera to only acquire odd-numbered image frames of the encrypted infrared images.

In the anti-peeping display system, the display apparatus includes an infrared projector for providing the encrypted infrared images; or the display apparatus is an organic electroluminescent display apparatus, and includes a plurality of pixel regions, and each of the plurality of pixel regions includes an organic electroluminescent element for emitting infrared light; or the display apparatus is a liquid crystal display apparatus, and includes a backlight source for providing infrared light.

In a third aspect, an anti-peeping display method is provided in the present disclosure and includes displaying, by a display apparatus, infrared images; acquiring, by at least one infrared camera, the infrared images, and generating original images according to the infrared images; and displaying, by a display screen, the original images.

Optionally, the anti-peeping display method further includes: imaging, via an imaging element, the original images displayed by the display screen so as to generate display images to be provided to a user; and controlling a distance between the display images and the display screen, so that the display images are located at a display region of the display apparatus.

Optionally, the imaging element includes a lens structure, and the controlling the distance between the display images and the display screen includes: controlling the display images to be upright and enlarged virtual images of the original images and controlling the distance between the display images and the display screen, by controlling a focal length of the lens structure.

Optionally, the anti-peeping display method further includes: encrypting the infrared image to generate encrypted infrared images; wherein the displaying, by the display apparatus, the infrared images includes: displaying, by the display apparatus, the encrypted infrared images. The acquiring, by the at least one infrared camera, the infrared images, and the generating the original images according to the infrared images includes: acquiring, by the at least one infrared camera, the encrypted infrared images; decrypting the encrypted infrared images to acquire the infrared images; and converting the infrared images into the original images.

Optionally, the infrared images include N initial image frames, and N is a positive integer larger than or equal to 1; the encrypting the infrared images to generate encrypted infrared images includes: generating an inverse image of each of the N initial image frames; and generating the encrypted infrared images, wherein the encrypted infrared images include 2N image frames, a (2K−1)-th image frame of the encrypted infrared images is a K-th initial image frame of the infrared images, and a 2K-th image frame of the encrypted infrared images is an inverse image of the (2K−1)-th image frame of the encrypted infrared images, wherein K is a positive integer larger than or equal to 1, and 1≤K≤N. The decrypting the encrypted infrared images to acquire the infrared images includes: controlling a sampling frequency of the at least one infrared camera to be same as a display frequency of the original images; and controlling the at least one infrared camera to only acquire odd-numbered image frames of the encrypted infrared images.

BRIEF DESCRIPTION OF THE DRAWINGS

In order to illustrate technical solutions according to embodiments of the present disclosure more clearly, drawings to be used in description of the embodiments will be described briefly hereinafter. Apparently, the drawings described hereinafter are only some embodiments of the present disclosure, and other drawings may be obtained by those skilled in the art according to those drawings without creative work.

DETAILED DESCRIPTION

The present disclosure provides an anti-peeping display method and an anti-peeping display apparatus. In the anti-peeping display method, a display apparatus is arranged to display infrared images, and a wearable apparatus is provided. The wearable apparatus includes an infrared camera, a display screen and a control unit. The control unit controls the infrared camera to collect the infrared images displayed by the display apparatus and generates original images according to the collected infrared images. The original images may be visible images that may be viewed by users with eyes directly. The display screen is connected to the infrared camera, and is configured to display the original images. Since infrared light is an electromagnetic wave having a wavelength in a range of 0.78 μm to 1000 μm, infrared light is invisible light invisible to human eyes. A user's eyes may not view infrared images displayed on the display apparatus directly, and the user may see the original images corresponding to the infrared images only through the wearable apparatus, thus achieving an anti-peeping purpose.

Specific embodiments of the present disclosure now will be described in detail in conjunction with the accompanying drawings and embodiments. The following embodiments are used to illustrate the present disclosure, rather than to limit the scope of the present disclosure.

Figure 1A:
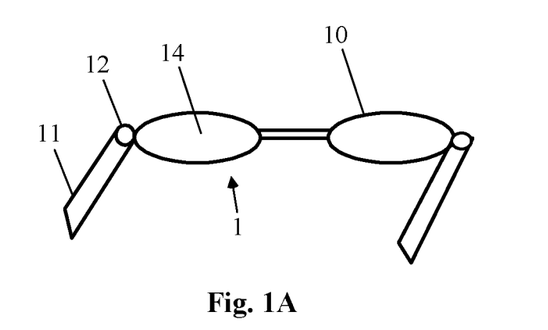
FIG. 1A illustrates a schematic structural diagram of a wearable apparatus according to some embodiments of the present disclosure.
Figure 1B:
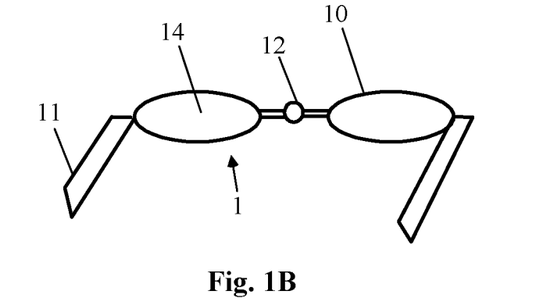
FIG. 1B illustrates another schematic structural diagram of the wearable apparatus according to some embodiments of the present disclosure.

Referring to FIG. 1A, FIG. 1B, FIG. 2A and FIG. 2B, some embodiments of the present disclosure provide a wearable apparatus 1. The wearable apparatus 1 includes an infrared camera 12, a display screen 14 and a control unit 13. The control unit 13 controls the infrared camera 1 to acquire infrared images. The infrared camera 1 generates original images according to the infrared images. Optionally, the infrared camera 1 may also transmit the acquired infrared images to the control unit 13, and the original images are generated by the control unit 13. The control unit 13 may further control the display screen 14 to display the original images. The infrared camera 12 of the wearable apparatus 1 may be located at one side of the wearable apparatus 1, as shown in FIG. 1A. The infrared camera 12 may also be located in the middle of the wearable apparatus 1, as shown in FIG. 1B. The infrared camera 12 may also be located at an upper side or a lower side (not shown in the figure) of the wearable apparatus 1 according to specific requirements. Therefore, a location of the infrared camera 12 is not specifically limited in the present disclosure.

Figure 2A:
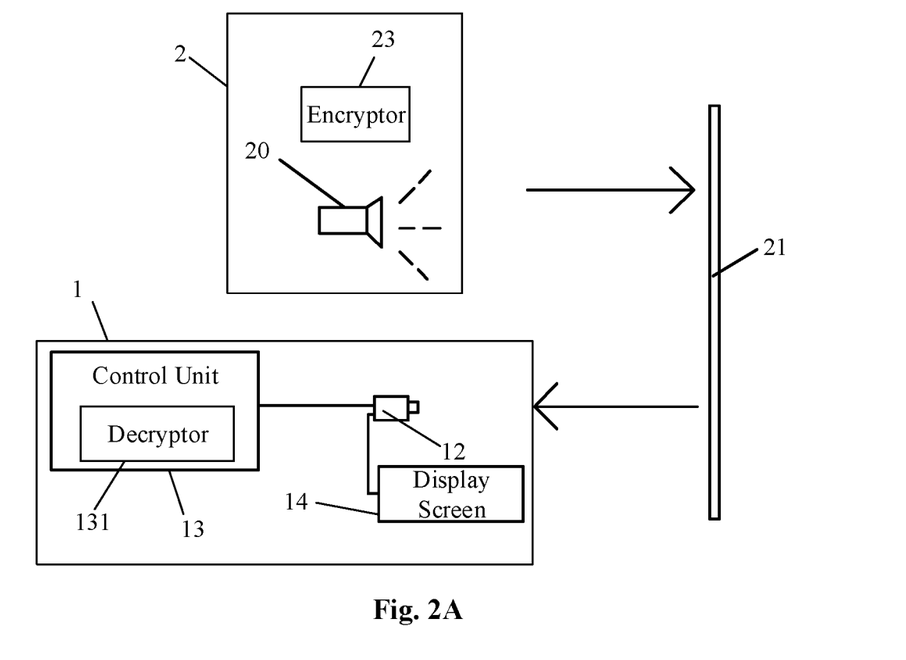
FIG. 2A illustrates a schematic structural diagram of an anti-peeping display system according to some embodiments of the present disclosure.
Figure 2B:
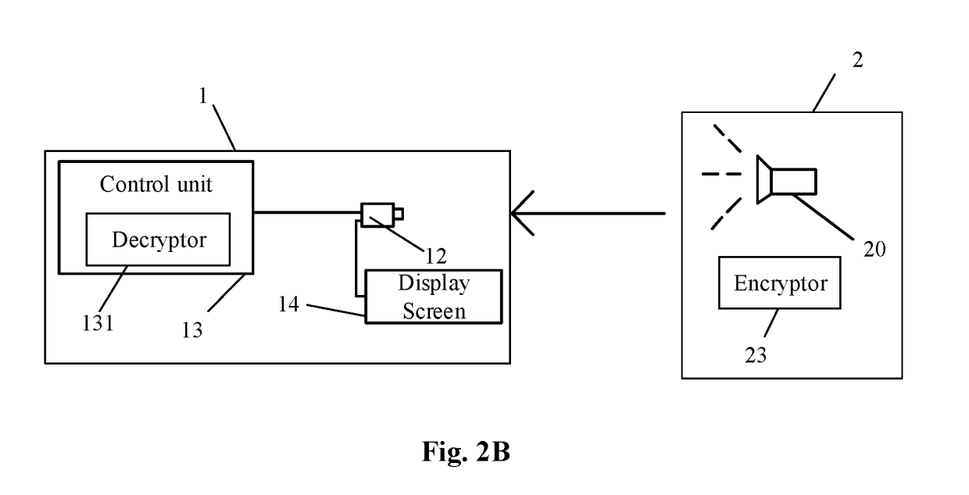
FIG. 2B illustrates another schematic structural diagram of the anti-peeping display system according to some embodiments of the present disclosure.

As shown in FIG. 2A and FIG. 2B, infrared images acquired by the infrared camera 12 are images displayed by the display apparatus 2 used by the user. The display apparatus 2 may be a display apparatus included in a mobile phone, a pad, a TV, a projection apparatus or the like. When the display apparatus 2 is a self-luminous display apparatus, the display apparatus 2 may be an organic electroluminescent display apparatus emitting infrared light. When the display apparatus 2 needs a backlight source to provide light rays required for display, the display apparatus 2 may be a liquid crystal display apparatus, and the backlight source provides infrared light. When the display apparatus 2 is a projection apparatus, the display apparatus may be an infrared projector 20, and the infrared projector 20 provides infrared images and projects the infrared images to a projection region 21. The projection region 21 may be a wall, a floor, a projection screen etc.

The display screen 14 is configured to display the original images, and the display screen 14 may be a liquid crystal display screen, an organic light emitting diode (OLED)

display screen etc. The original images are visible images, i.e., light from the display screen 14 is the visible light which enables a user's eyes to view the original images directly. The control unit 13 includes a processor, a driving circuit etc. The processor and the driving circuit may be a processor and a driving circuit already known to those skilled in the art and capable of realizing technical solutions of the present disclosure. Therefore, detailed descriptions about the processor and the driving circuit are omitted in the present disclosure.

The above wearable apparatus 1 is capable of acquiring infrared images, and converting the infrared images into the original images, and the original images are images that may be viewed by a user's eyes directly. That is, a user who wears the wearable apparatus may see the original images corresponding to the infrared images, whereas a user who does not wear the wearable apparatus may not observe the infrared images on the display apparatus, thus realizing an anti-peeping purpose.

The original images, specifically, may be any one of full color images and black-and-white images, and may be viewed by users with eyes. The wearable apparatus may be, but may not be limited to be, a form of eyeglasses or a helmet. An example that the wearable apparatus are eyeglasses now will be described below. It should be noted that, when the wearable apparatus is a helmet, an arranging manner of main components of the helmet is similar to that of the example that the wearable apparatus are eyeglasses, and therefore, the arranging manner of an example that the wearable apparatus is the helmet also falls within the protection scope of the present disclosure.

As shown in FIG. 1A and FIG. 1B, in the example that the wearable apparatus 1 are the eyeglasses, the wearable apparatus 1 may include two display screens 14 arranged corresponding to the user's two eyes. The two display screens 14 may display a same image to realize a two-dimensional (2D) display. The two display screens 2 may also display two images having different viewing angles to realize a three-dimensional (3D) display. A specific principle of the 3D display is as follow. The wearable apparatus includes two infrared cameras 12, as shown in FIG. 1A, and one of the two infrared cameras 12 captures odd-numbered image frames of N initial image frames of infrared images displayed by the display apparatus 2, and the other infrared camera 12 captures even-numbered image frames of the N initial image frames of the infrared images displayed by the display apparatus 2, wherein N is a positive integer larger than or equal to 1.

Optionally, instead of the above solution in which two infrared cameras are employed to capture odd-numbered image frames and even-numbered image frames of the infrared images respectively, a polarization grating (FPR) may be arranged on the display apparatus 2 and different polarizing film filters may be installed on the two infrared cameras 12. Odd-numbered row pixels and even-numbered row pixels of each initial image frame of the infrared image displayed on display apparatus 2 are separated by the polarization grating. Through the different polarizing film filters installed on the two infrared cameras 12, the odd-numbered row pixels of each initial image frame are provided to one of the infrared cameras 12, and the even-numbered row pixels of each initial image are provided to the other of the infrared cameras 12. The two infrared cameras 12 generate original images to be displayed on the display screens 14 based on the acquired odd-numbered row pixels and even-numbered row pixels, respectively. An original image formed based on the odd-numbered row pixels and an original image formed based on the even-numbered row pixels are images having different viewing angles, and are provided to a left eye and a right eye of the user respectively, thus realizing a 3D display.

The infrared camera 12 and the control unit 13 may be disposed on an arm 11 of the eyeglasses (as shown in FIG. 1A), and may also be disposed on a connecting beam in the middle of the two display screens 14 (as shown in FIG. 1B).

When the wearable apparatus is the helmet, the wearable apparatus may include one display screen. Of course, the display screen 14 may display a 2D image, and may also realize a naked-eye 3D display by using the grating on the display screen 14, a specific principle of which will not be described in detail herein.

It should be noted that, a display principle of the display screen is not limited to the above, other manners may also be employed to realize the 3D display and are also applied to the technical solutions of the present disclosure.

Figure 3:
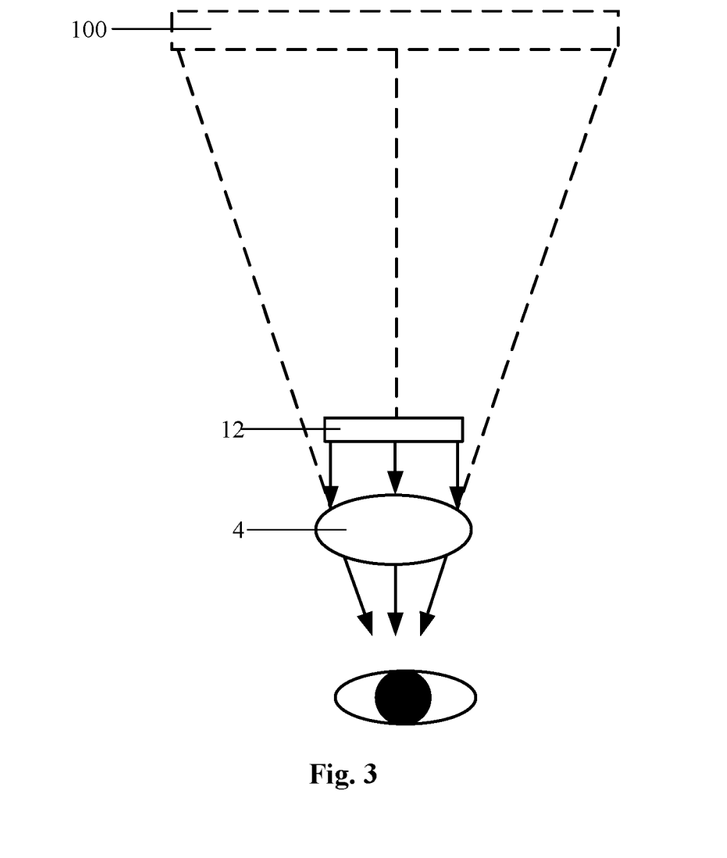
FIG. 3 illustrates a schematic diagram of a principle that original images of a display screen are imaged via an imaging element according to some embodiments of the present disclosure.

As shown in FIG. 3, in some embodiments of the present disclosure, the wearable apparatus 1 further includes at least one imaging element 4 disposed at a display side of the display screen 14. The original images are imaged via the at least one imaging element 4 to form display images 100 to be presented to the user. The at least one imaging element 4 is further configured to control a distance between the display images 100 and the display screen 14, wherein the display side is a side of display screen 14 facing human eyes and facing away from the display apparatus.

According to the technical solution, the distance between the display images to be presented to the user and the display screen may be controlled by arranging the imaging element at the display side of the display screen, so that the display images are located at the display region of the display apparatus so as to enable the user to view more realistic images and improve the user's experience.

The at least one imaging element 4 may include a lens structure, and the original images are imaged via the lens structure to form display images. The display images specifically are upright and enlarged virtual images of the original images, which are more realistic.

The lens structure may be a liquid crystal lens structure with an adjustable focal length, so as to improve versatility and flexibility of the apparatus. The distance between the display images to be presented to the user and the display screen is adjusted by adjusting a variable focal length, thus further adjusting the display images to match the display region of the display apparatus and enabling the display image to be located at the display region of the display apparatus, so that the images viewed by the user on the display apparatus are more realistic.

Of course, the imaging element is not restricted to be a lens structure, for example, a pinhole structure may also be employed to realize imaging by using a pinhole imaging principle, which will not be limited herein.

In conjunction with FIG. 1A and FIG. 3, the wearable apparatus may be an eyeglasses structure, and specifically, may include: two display screen frames 10 corresponding to locations of the user's two eyes respectively; two arms 11 disposed opposite to each other and located at two sides of the two display screen frames 10 respectively; two display screens 14 fixed in the two display screen frames 10 respectively; two infrared cameras 1 fixed on the two arms respectively and proximal to the two display screen frames 10; two control units (not shown in FIG. 1A and FIG. 3) fixed on the two arms 11 and configured to control corresponding infrared cameras 12 to acquire the infrared images, wherein the infrared cameras 12 generate the original images according to the infrared images, the two display screens 14 display the original images outputted by corresponding adjacent infrared camera 12, respectively; and the imaging element 4 disposed at the display side of each display screen 14, wherein the imaging element 4 includes a lens structure, the original images displayed by the display screen 14 are imaged via the imaging element 4 to form the display images 100 to be provided to the user, and the display images 100 are upright and enlarged virtual images of the original images.

The above wearable apparatus enables the user to view the display images 100 of the infrared images displayed by the display apparatus, while other users who do not wear the wearable apparatus may not observe the infrared images displayed by the display apparatus, thus realizing the anti-peeping purpose. Whether the display images 100 that the user finally views are 2D images or 3D images is not limited herein.

On basis of a same concept, as shown in FIG. 2A and FIG. 2B, some embodiments of the present disclosure provide an anti-peeping display system. The anti-peeping display system includes a display apparatus 2 for display infrared images; the wearable apparatus 1 including the infrared camera 12, the display screen 14 and the control unit 13, wherein the control unit 13 is configured to control the infrared camera 12 to acquire the infrared images, the infrared camera 12 generates the original images according to the infrared images, and the control unit 13 is further configured to control the display screen 14 to display the original images.

The original images provided to the user by the anti-peeping display system are images that may be viewed by the user's eyes directly, whereas the images displayed by the display apparatus are the infrared images, and only users who wear the wearable apparatus may view the original images corresponding to the infrared images, whereas users who do not wear the wearable apparatus may not recognize the infrared images, thus achieving the anti-peeping purpose.

As shown in FIG. 2A, the display apparatus 2 may include an infrared projection device, such as an infrared projector. The infrared projector is configured to provide the infrared images and project the infrared images to the projection region 21 for display. After a user wears the wearable apparatus, the user may view the original images corresponding to the infrared images by using eyes directly. The original images are visible images, such as the full color images and the black-and-white images.

As shown in FIG. 2B, the display apparatus 2 may also be the self-luminous display apparatus, such as the organic electroluminescent display apparatus, wherein the display apparatus 2 includes a plurality of pixel regions, each of the pixel regions includes an organic electroluminescent element emitting infrared light for display. The display apparatus 2 may also be a non-self-luminous display apparatus, such as a liquid crystal display apparatus, wherein the display apparatus 2 includes a backlight source for providing infrared light required for display.

According to the above technical solution, the distance between the display images to be provided to the user and the display screen may be controlled by arranging the imaging element at the display side of the display screen, so that the display images are located at the display region of the display apparatus, thus enabling the user to view more realistic images and improving the user's experience.

To further improve an anti-peeping effect, the display apparatus 2 is arranged to include an encryptor 23, and encrypted infrared images are generated after the infrared images are encrypted by the encryptor 23. The display apparatus 2 displays encrypted infrared images. The control unit 13 includes a decryptor 131 for controlling the infrared camera 12 to decrypt to the acquired encrypted infrared images so as to acquire the infrared images. The infrared camera converts the infrared images to the original images.

Figure 2C:
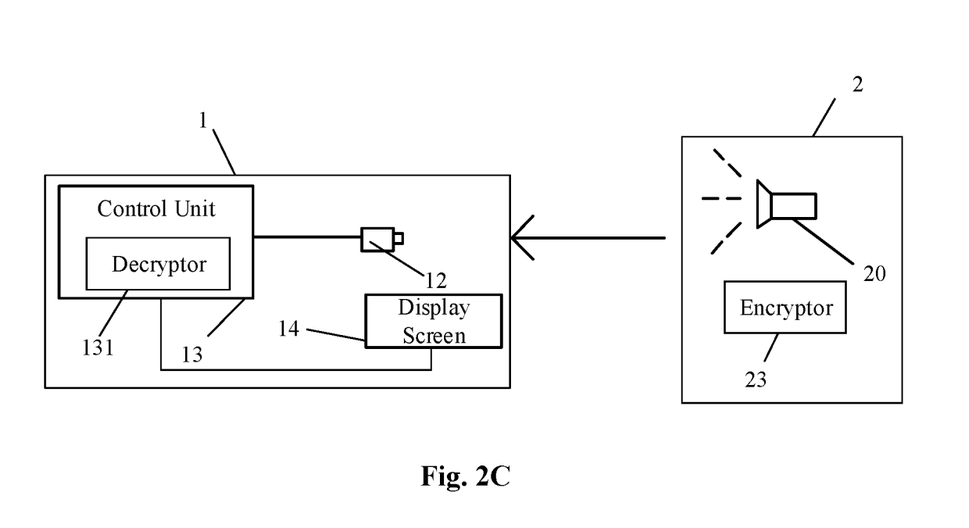
FIG. 2C illustrates yet another schematic structural diagram of the anti-peeping display system according to some embodiments of the present disclosure.

Optionally, referring to FIG. 2C, the infrared camera 12 may also transmit the acquired encrypted infrared images to the decryptor 131, and the decryptor 131 decrypts the acquired encrypted infrared images and transmits the decrypted images to the display screen 14 for display.

According to the above technical solution, the encrypted infrared images are generated by encrypting the infrared images, so that the infrared images may not be acquired even if the user wears the wearable apparatus capable of recognizing the infrared images. Only thorough a correct decryption procedure, the infrared images may be acquired to generate corresponding original images to be provided to the user and therefore the anti-peeping effect is better.

In some embodiments of the present disclosure, the infrared images are encrypted and decrypted by an algorithm as follows. The infrared images include N initial image frames, wherein N is a positive integer larger than or equal to 1. The encryptor 23 is configured to form inverse images of the initial image frames, and generate the encrypted infrared images. The encrypted infrared images include 2N image frames, a (2K−1)-th image frame of the encrypted infrared images is a K-th initial image frame of the infrared images, and a 2K-th image frame of the encrypted infrared images is an inverse image of the (2K−1)-th image frame of the encrypted infrared images, wherein K is a positive integer, and $1 \leq K \leq N$.

Figure 4A:
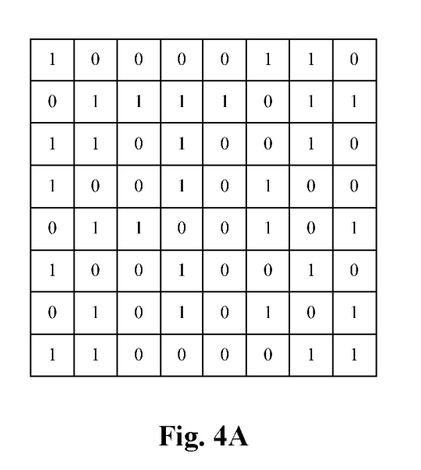
FIG. 4A illustrates a schematic diagram of a temperature distribution of an odd-numbered image frame of encrypted infrared images according to some embodiments of the present disclosure.
Figure 4B:
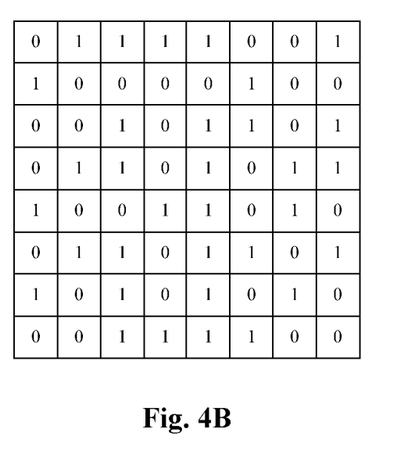
FIG. 4B illustrates a schematic diagram of a temperature distribution of a next even-numbered image frame adjacent to the odd-numbered image frame shown in FIG. 4A.
Figure 4C:
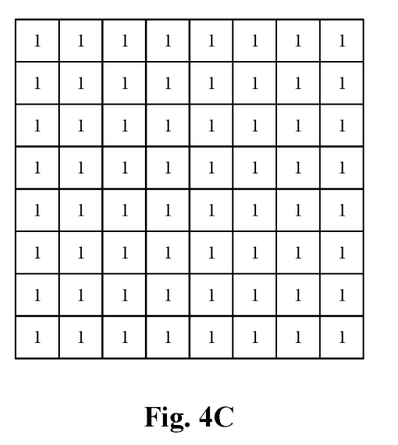
FIG. 4C illustrates an actual display effect view of an odd-numbered image frame and a next even-numbered image frame adjacent to the odd-numbered image frame of encrypted infrared images according to some embodiments of the present disclosure.

FIG. 4A illustrates a temperature distribution diagram of the (2K−1)-th image frame. FIG. 4B illustrates a temperature distribution diagram of the 2K-th image frame. In FIG. 4A and FIG. 4B, '1' represents a region with image information, '0' represents a region without image information. Through performing an image fusion of the (2K−1)-th image frame and the 2K-th image frame, a temperature distribution of an image projected in the projection region may be uniform, as shown in FIG. 4C. Therefore, it is difficult to acquire a precise temperature distribution and a precise image distribution of the original images by using a general infrared camera.

For an image having a grayscale temperature, temperature compensation may be performed. In case that "1" is taken as a normalized temperature, if a temperature distribution in a certain area of the projected image in an odd-numbered image frame is X ($0 \leq X \leq 1$), then a temperature distribution of a same area of the projected image in an even-numbered image frame corresponding to the odd-numbered image frame should be '1-X'.

In order to correctly decrypt the encrypted infrared images, the wearable apparatus 2 needs to perform a timing synchronization and a frame-frequency synchronization with the display apparatus 2. The control unit 13 may realize the timing synchronization with the display apparatus 2 in a wired or wireless manner (e.g., infrared, Bluetooth, Wi-Fi, third generation wireless communication technology, fourth generation wireless communication technology or other wireless communication technology) and acquire a frame frequency (or a display frequency) of the original images from the display apparatus 2.

When the wearable apparatus performs a decryption operation, the control unit 13 controls a sampling frequency of the infrared camera 12 to be identical to a display frequency of the original images, and controls the infrared camera 12 to only acquire odd-numbered image frames or even-numbered image frames of the encrypted infrared images so as to acquire the infrared images.

In the above technical solution, after the infrared image are encrypted by the encryptor, an odd-numbered image frame and an even-numbered image frame next to the odd-numbered image frame (i.e., continuous two image frames, e.g., a first image frame and a second image frame, a third image frame and a fourth image frame, . . . , and the (2K−1)-th image frame and the 2K-th image frame) are images inverse to each other, an actual display superimposition effect of the continuous two encrypted infrared image frames is shown in FIG. 4C. It may be seen from FIG. 4C that the encrypted infrared images are unclear infrared images. Only after the decryption operation is performed by above decryption programs, the infrared camera may acquire clear infrared images, and then convert the infrared images to the original images to be provided to the user for viewing, thus improving the anti-peeping effect. It should be noted that, an algorithm for encrypting the infrared images may be any algorithm already known to those skilled in the art and capable of encrypting infrared images.

Optionally, the anti-peeping display system according to the present disclosure includes: the display apparatus 2 including the encryptor 23, wherein the encryptor 23 is configured to encrypt the infrared images to generate encrypted infrared images, and the display apparatus 2 displays the encrypted infrared images; the wearable apparatus 1 including one or more infrared cameras 12, the control unit 13 and the display screen 14, wherein the control unit 13 is configured to control the one or more infrared camera 12 to acquire the encrypted infrared images, and the control unit 13 includes the decryptor 131, the decryptor 131 controls the one or more infrared cameras 12 to decrypt the encrypted infrared images to generate the infrared images, and the one or more infrared cameras 12 convert the infrared images into the original images, and the control unit 13 is further configured to control the display screen 14 to display the original images; the imaging element 4, disposed at the display side of the display screen 14, wherein the original images displayed by the display screen 14 are imaged via the imaging element 4, display images to be provided to the user are generated, and the display images are upright and enlarged virtual images of the original images. The imaging element 4 may further control a distance between the display images and the imaging element 4, so that the display images are located at a display region of the display apparatus.

The above anti-peeping display system has a better anti-peeping effect, and enables the user to view more realistic images by arranging the imaging element, thus improving the user's experience.

Figure 5A:
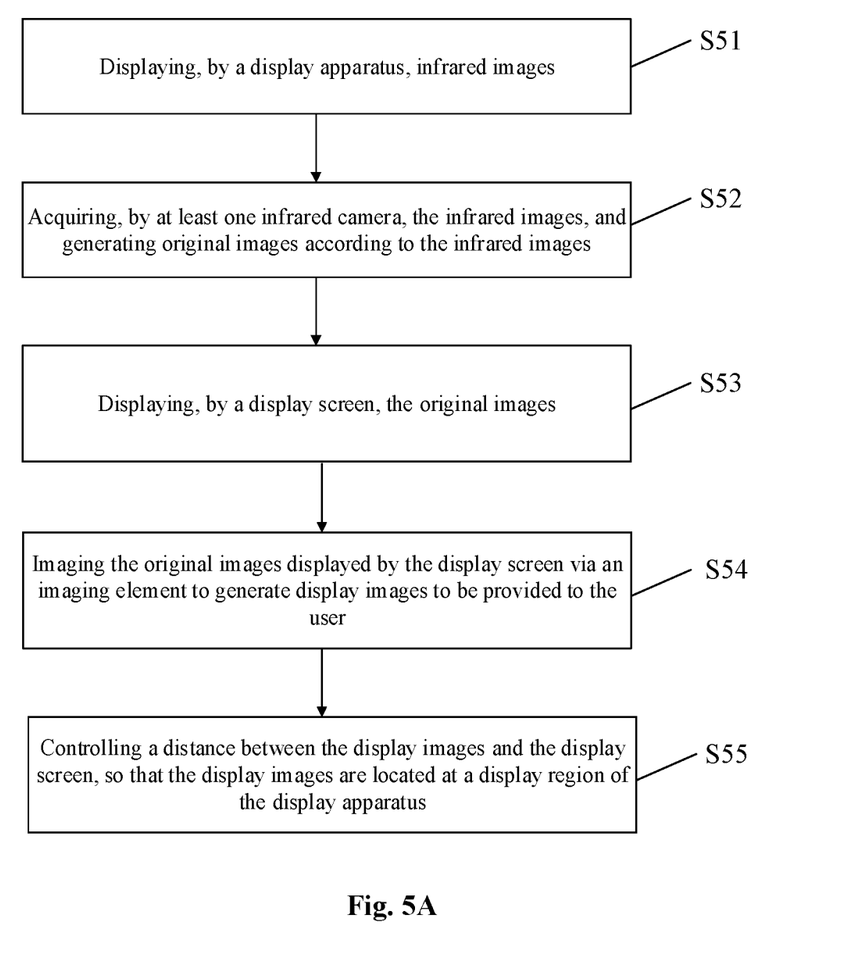
FIG. 5A illustrates a flowchart of an anti-peeping display method according to some embodiments of the present disclosure.
Figure 5B:
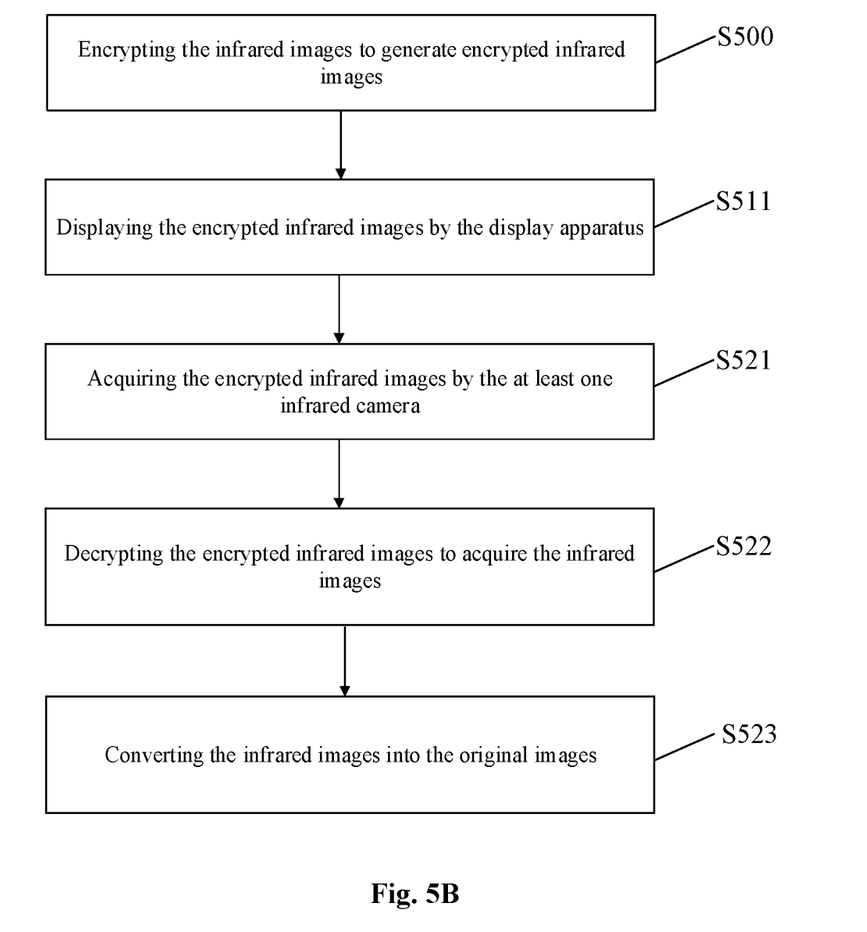
FIG. 5B illustrates a detailed flowchart of the anti-peeping display method according to some embodiments of the present disclosure.

Referring to FIG. 5A and FIG. 5B, some embodiments of the present disclosure provide an anti-peeping display method applied to the anti-peeping display system provided in the present disclosure. The method includes steps S51 to S53.

S51: displaying, by the display apparatus, infrared images.

S52: acquiring, by at least one infrared camera, the infrared images, and generating the original images according to the infrared images.

S53: displaying, by the display screen, the original images.

According to the above anti-peeping display method, the display apparatus is arranged in such a way that the images displayed by the display apparatus are the infrared images. Only through converting the infrared images by the infrared camera into the original images (visible images) to be provided to the user, the user may recognize the infrared images indirectly through the original images, while users who may not acquire the original images may not recognize the infrared images displayed on the display apparatus, thus achieving the anti-peeping purpose.

A specific implementation structure of the display apparatus for displaying infrared images already has been described in foregoing embodiments, and will not be described in detail herein.

In some embodiments of the present disclosure, the anti-peeping display method further includes steps S54 to S55.

S54: imaging the original images displayed by the display screen via the imaging element to generate display images to be provided to the user.

S55: controlling a distance between the display images and the display screen, so that the display images are located at a display region of the display apparatus.

In the above steps, the distance between the display images to be provided to the user and the display screen may be controlled by arranging the imaging element at the display side of the display screen, so that the display images are located at the display region of the display apparatus, thus enabling the user to view more realistic images and improving the user's experience.

The imaging element may include a lens structure, the original images are imaged via the lens structure to form the display images, wherein the controlling the distance between the display images and the display screen, specifically, includes: controlling the display images to be upright and enlarged virtual images of the original images and controlling the distance between the display images and the display screen, by controlling a focal length of the lens structure.

In the above steps, by controlling the focal length of the lens structure, the display images finally provided to the user are the upright and enlarged virtual images of the original images and are more realistic.

In order to further improve the anti-peeping effect, prior to the above step S51, the anti-peeping display method according to some embodiments of the present disclosure further includes step S500.

S500: encrypting the infrared images to generate encrypted infrared images.

In this case, the step S51 specifically includes: displaying the encrypted infrared images by the display apparatus.

The step S52 specifically includes substeps S521 to S523.

S521: acquiring the encrypted infrared images by the at least one infrared camera.

S522: decrypting the encrypted infrared images to acquire the infrared images.

S523: converting the infrared images into the original images.

In the above technical solution, the infrared images are encrypted to generate the encrypted infrared images, so that the encrypted infrared images are unclear unrecognizable infrared images even if a user acquired the encrypted infrared images by an infrared camera. Only through a correct decryption operation, recognizable infrared images may be acquired, and original images corresponding to the recognizable infrared images are generated and provided to the user, and therefore the anti-peeping effect is better.

In some embodiments of the present disclosure, the infrared images include N initial image frames, wherein N is a positive integer larger than or equal to 1. Step S50 specifically includes: generating an inverse image of each of the N initial image frames; generating the encrypted infrared images, wherein the encrypted infrared images include 2N image frames, a (2K−1)-th image frame of the encrypted infrared images is a K-th initial image frame of the infrared images, and a 2K-th image frame of the encrypted infrared images is an inverse image of the (2K−1)-th image frame of the encrypted infrared images, wherein K is a positive integer, and 1≤K≤N.

Optionally, the step S522 specifically includes: controlling a sampling frequency of the at least one infrared camera to be identical to a display frequency of the original images, and controlling the at least one infrared camera to only acquire odd-numbered image frames of the encrypted infrared images so as to acquire the infrared images.

In the above technical solution, after the infrared images are encrypted by the encryptor, an odd-numbered image frame and an even-numbered image frame next to the odd-numbered image frame (i.e., continuous image frames, e.g., a first image frame and a second image frame, a third image frame and a fourth image frame, . . . , and a (2K−1)-th image frame and a 2K-th image frame) are images inverse to each other, and the generated encrypted infrared images are unclear infrared images and cannot be recognized. Only through the decryption operation performed by the decryptor, the at least one infrared camera may acquire clear infrared images and then convert the infrared images into the original images to be provided to the user for viewing, thus improving the anti-peeping effect.

In some embodiments of the present disclosure, the step S51, specifically includes a sub-step S511.

S511: displaying the encrypted infrared images by the display apparatus.

The original images displayed by the display screen are imaged via the imaging element to generate the display images to be provided to the user. The display images are upright and enlarged virtual images of the original images. A distance between the display images and the display screen is controlled, so that the display images are located at a display region of the display apparatus.

The above anti-peeping display method has a better anti-peeping effect, and enables the user to view more realistic images by using the imaging element, thus improving the user's experience.

It should be noted that, the control unit, the encryptor and the decryptor in the present disclosure may be implemented by complete hardware, complete software, or a combination of software and hardware. Furthermore, the control unit, the encryptor and the decryptor in present disclosure may take a form of computer program products implemented by one or more computer-usable storage mediums (including, but being not limited to, a disk memory, an optical memory, etc.) including computer-executable program codes. The control unit, the encryptor and the decryptor disclosed by the embodiments of the present invention may be implemented by one or more processors. Implementation of the control unit, the encryptor and the decryptor may be implemented by integrated logic circuits in a form of hardware in the one or more processors or by instructions in a form of software. The one or more processors may be a general-purpose processor, a digital signal processor (DSP), an application-specific integrated circuit (ASIC), a field programmable gate array (FPGA) or other programmable logic devices (PLDs), discrete gates or transistor logic devices, discrete hardware components. The general-purpose processor may be a microprocessor or any conventional processors. The control unit, the encryptor and the decryptor disclosed in the embodiments of the present invention may be embodied as a hardware processor directly, or implemented by a combination of hardware in the one or more processors and software modules. The software modules may be located in a storage medium that is well known in the art, such as a random access memory (RAM), a flash memory, a read only memory (ROM), a programmable read only memory (PROM) or an electrically erasable programmable, a register, and the like. The storage medium may be located in a memory, and the processor reads information in the memory so as to realize functions of the control unit, the encryptor and the decryptor combined with the hardware thereof. The above are merely optional embodiments of the present disclosure. It should be noted that, a person skilled in the art may make numerous improvements and substitutions without departing from technical principles of the present disclosure, and these improvements and substitutions shall also fall within the protection scope of the present disclosure.

What is claimed is:

1. A wearable apparatus, comprising:
    at least one infrared camera for acquiring infrared images;
    a controller for generating at least one original image according to the infrared images; and
    at least one display screen for displaying the at least one original image;
    wherein the at least one original image is at least one visible image, and the at least one original image comprises a same image for realizing a two-dimensional display, or the at least one original image comprises two images having different viewing angles and for realizing a three-dimensional display, the infrared images are encrypted infrared images,
    the controller comprises a decryptor, the decryptor is for decrypting the encrypted infrared images or controlling the at least one infrared camera to decrypt the encrypted infrared images.

2. The wearable apparatus according to claim 1, further comprising:
    at least one imaging element, at a display side of the at least one display screen and for imaging the at least one original image so as to generate at least one display image, wherein the at least one imaging element is further to control a distance between the at least one display image and the at least one display screen, so that the at least one display image is located at a display region of a display apparatus providing the infrared images,
    wherein the at least one display image is at least one upright and enlarged virtual image of the at least one original image.

3. The wearable apparatus according to claim 2, wherein the at least one imaging element comprises a liquid crystal lens structure with an adjustable focal length.

4. An anti-peeping display system, comprising:
    a display apparatus for displaying infrared images;
    at least one infrared camera for acquiring the infrared images;
    a controller for generating at least one original image according to the infrared images; and
    at least one display screen for displaying the at least one original image;
    wherein the at least one original image is at least one visible image, and the at least one original image comprises a same image for realizing a two-dimensional display, or the at least one original image comprises two images having different viewing angles and for realizing a three-dimensional display, the display apparatus comprises an encryptor for encrypting the infrared images so as to generate encrypted infrared images; and the controller further comprises a decryptor for decrypting the encrypted infrared images or controlling the at least one infrared camera to decrypt the encrypted infrared images.

5. The anti-peeping display system according to claim claim 4, wherein the infrared images comprise N initial image frames, N is a positive integer larger than or equal to 1, the encryptor is for generating an inverse image of each of the N initial image frames, the encrypted infrared images comprise 2N image frames, a (2K-1)-th image frame of the encrypted infrared images is a K-th initial image frame of the infrared images, and a 2K-th image frame of the encrypted infrared images is an inverse image of the (2K-1)-th image frame of the encrypted infrared images, wherein K is a positive integer larger than or equal to 1, and $1 \leq K \leq N$;

the decryptor is for controlling a sampling frequency of the at least one infrared camera to be same as a display frequency of the initial image frames, and controlling the at least one infrared camera to only acquire odd-numbered image frames of the encrypted infrared images.

6. The anti-peeping display system according to claim 5, wherein the display apparatus comprises an infrared projector for providing the encrypted infrared images; or the display apparatus is an organic electroluminescent display apparatus, and comprises a plurality of pixel regions, and each of the plurality of pixel regions comprises an organic electroluminescent element for emitting infrared light; or the display apparatus is a liquid crystal display apparatus, and comprises a backlight source for providing infrared light.

7. The anti-peeping display system according to claim 4, wherein the display apparatus comprises an infrared projector for providing the encrypted infrared images; or the display apparatus is an organic electroluminescent display apparatus, and comprises a plurality of pixel regions, and each of the plurality of pixel regions comprises an organic electroluminescent element for emitting infrared light; or the display apparatus is a liquid crystal display apparatus, and comprises a backlight source for providing infrared light.

8. An anti-peeping display method, comprising:

encrypting, by a display apparatus, infrared images to generate encrypted infrared images;

displaying, by the display apparatus, the encrypted infrared images;

acquiring, by at least one infrared camera, the encrypted infrared images, and generating original images according to the infrared images;

decrypting the encrypted infrared images to acquire the infrared images;

converting the infrared images into the original images; and displaying, by a display screen, the original images.

9. The anti-peeping display method according to claim 8, further comprising:

imaging, via an imaging element, the original images displayed by the display screen so as to generate display images to be provided to a user; and controlling a distance between the display images and the display screen, so that the display images are located at a display region of the display apparatus.

10. The anti-peeping display method according to claim 9, wherein the imaging element comprises a lens structure, and the controlling the distance between the display images and the display screen comprises:

controlling the display images to be upright and enlarged virtual images of the original images and controlling the distance between the display images and the display screen, by controlling a focal length of the lens structure.

11. The anti-peeping display method according to claim 8, wherein the infrared images comprise N initial image frames, and N is a positive integer larger than or equal to 1;

the encrypting the infrared images to generate encrypted infrared images comprises:

generating an inverse image of each of the N initial image frames; and generating the encrypted infrared images, wherein the encrypted infrared images comprise 2N image frames, a (2K-1)-th image frame of the encrypted infrared images is a K-th initial image frame of the infrared images, and a 2K-th image frame of the encrypted infrared images is an inverse image of the (2K-1)-th image frame of the encrypted infrared images, wherein K is a positive integer larger than or equal to 1, and $1 \leq K \leq N$;

the decrypting the encrypted infrared images to acquire the infrared images comprises:

controlling a sampling frequency of the at least one infrared camera to be same as a display frequency of the original images; and controlling the at least one infrared camera to only acquire odd-numbered image frames of the encrypted infrared images.

\* \* \* \* \*